US007974897B2

(12) United States Patent
Caffrey et al.

(10) Patent No.: US 7,974,897 B2
(45) Date of Patent: Jul. 5, 2011

(54) SYSTEM AND METHOD FACILITATING TRI-PARTY REPURCHASE AGREEMENT TRANSACTIONS

(75) Inventors: Kevin Caffrey, Amityville, NY (US); Charles Austin, Stamford, CT (US)

(73) Assignee: The Bank of New York Mellon Corporation, New York, NY (US)

( * ) Notice: Subject to any disclaimer, the term of this patent is extended or adjusted under 35 U.S.C. 154(b) by 572 days.

(21) Appl. No.: 11/847,978

(22) Filed: Aug. 30, 2007

(65) Prior Publication Data

US 2009/0063323 A1    Mar. 5, 2009

(51) Int. Cl.
  *G06Q 40/00* (2006.01)
(52) U.S. Cl. ............. 705/35; 705/36 R; 705/37; 705/38; 705/39
(58) Field of Classification Search .................... 705/35, 705/39, 40
  See application file for complete search history.

(56) References Cited

U.S. PATENT DOCUMENTS

| 5,802,499 A | 9/1998 | Sampson | |
|---|---|---|---|
| 6,016,482 A | 1/2000 | Molinari | |
| 6,125,355 A | 9/2000 | Bekaert | |
| 6,304,858 B1 | 10/2001 | Mosler | |
| 7,089,207 B1 * | 8/2006 | Lardy et al. | 705/38 |
| 7,401,048 B2 * | 7/2008 | Rosedale et al. | 705/37 |
| 2002/0147670 A1 | 10/2002 | Lange | |
| 2003/0074300 A1 * | 4/2003 | Norris | 705/37 |
| 2005/0171892 A1 * | 8/2005 | Naas et al. | 705/37 |
| 2006/0253361 A1 * | 11/2006 | Robinson et al. | 705/35 |
| 2008/0065532 A1 * | 3/2008 | De La Motte | 705/39 |
| 2008/0120213 A1 * | 5/2008 | Morik | 705/35 |

FOREIGN PATENT DOCUMENTS

WO    2007/095519 A3    8/2007
WO    2008/063922 A2    5/2008

OTHER PUBLICATIONS

International Search Report issued in PCT/US2007/62030, Sep. 12, 2007, 2 pages.
Written Opinion of the Searching Authority issued in PCT/US2007/62030, Sep. 12, 2007, 5 pages.

* cited by examiner

*Primary Examiner* — James P Trammell
(74) *Attorney, Agent, or Firm* — Pillsbury Winthrop Shaw Pittman LLP; Larry J. Hume (57) ABSTRACT

In accordance with at least one embodiment of the invention, a DVP repo and tri-party repo hybrid transaction is provided as well as a process for facilitating and processing such a hybrid transaction, referred to herein as a "tri-party hybrid repo" transaction.

24 Claims, 13 Drawing Sheets

SYSTEM AND METHOD FACILITATING TRI-PARTY REPURCHASE AGREEMENT TRANSACTIONS

BACKGROUND OF THE INVENTION

1. Field of the Invention

The present invention relates to administering and facilitating financial transactions. More specifically, the present invention relates to automated handling of financial transactions known as Repurchase Agreements, which are also commonly known as "repo" agreements.

2. Description of Related Art

A repurchase agreement or "repo" agreement (or, simply, a"repo") is a contract giving the seller of an asset the right or obligation to buy back the asset at a specified price on a given date. Generally speaking, a repo agreement is a form of short term borrowing for dealers in various types of assets, e.g., government securities, loan obligations, etc. The dealer sells the assets to investors, usually on an overnight basis, and buys them back the following day. For the party (e.g., a dealer). selling the assets, and agreeing to repurchase it in the future, it is a "repo"; for the party (e.g., an investor) on the other end of the transaction, buying the asset and agreeing to sell in the future, it is a "reverse repurchase agreement." However, the transaction is often just simply termed a "repo" by both parties. A repo is similar to a secured loan, with the lender of money receiving assets as collateral to protect against default. The legal title to the assets passes from the dealer or seller, i.e., the provider of the collateral, to the investor, i.e., the party providing the money.

For the buyer or investor (the "buyer/investor"), a repo is an opportunity to invest cash for an agreed-upon period of time, typically overnight, whereas other investments typically involve whole numbers of months. Moreover, a repo is a short-term and secure investment; in return for investing, the buyer/investor receives a rate of interest as well as collateral to secure the investment.

For the dealer or seller (the "broker/dealer/seller"), repos are used to cost effectively finance long positions in securities or other assets in the dealer's or seller's portfolio.

In practice, a repo agreement can be transacted in several ways. In a first way, the buyer/investor and the broker/dealer/seller negotiate with one another and close an agreed-to deal without any outside assistance. The broker/dealer/seller then would deliver securities to the buyer/investor and the buyer/investor would deliver cash to the broker/dealer/seller. This is typically referred to as a "DVP repo," or "delivery versus payment repo."

Figure 1:
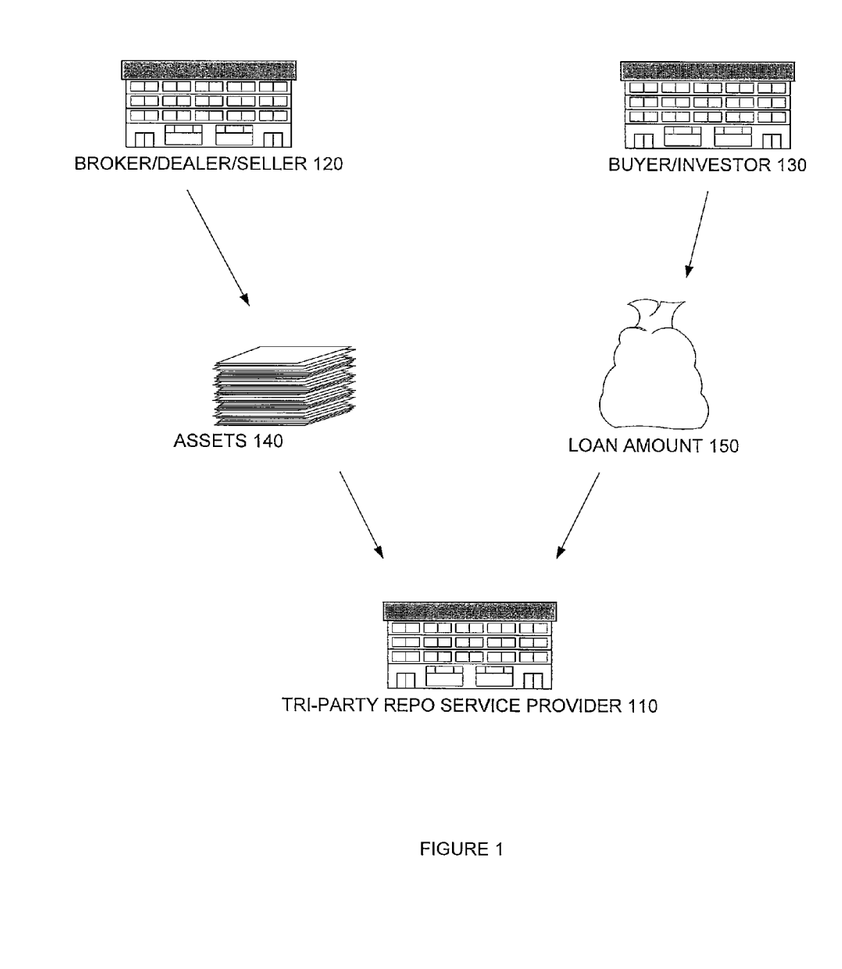
FIG. 1 illustrates a typical structure of a conventional tri-party repo transaction.

A second, more common way to effect a repo transaction is to involve a trusted third party, or intermediary, to match the details of the trade agreed between the broker/dealer/seller and the buyer/investor, and to assume all of the post trade processing and settlement work related to the trade; this is typically referred to as a "tri-party repo." The third party is typically a bank. As illustrated in FIG. 1, in a tri-party repo, the third party acts as a "tri-party repo service provider" 110 to the two principal parties in the underlying trade, i.e., the broker/dealer/seller 120 and the buyer/investor 130. Typical types of underlying trades include not only repurchase agreements, but also securities lending agreements, loan agreements, derivatives agreements and others.

Figure 2:
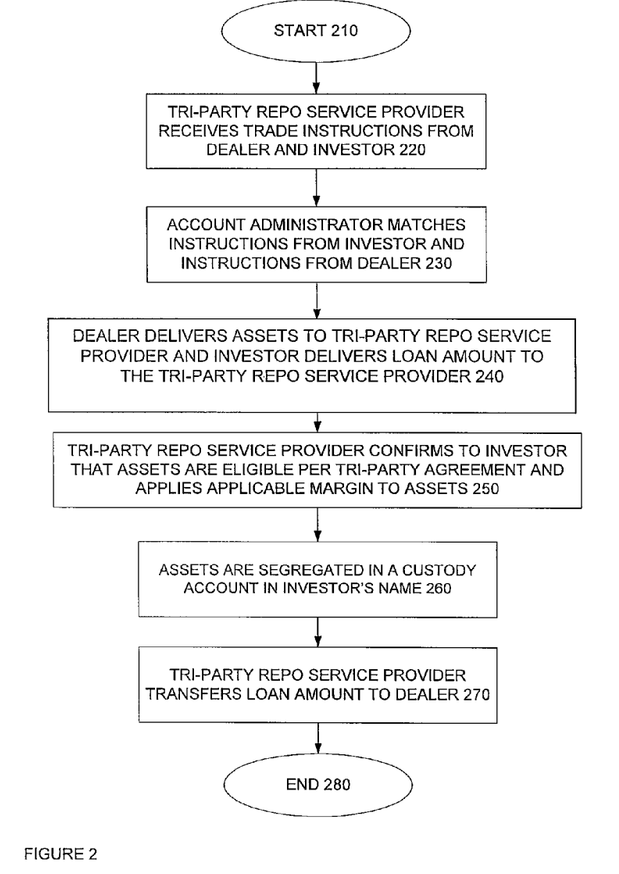
FIG. 2 illustrates a conventional tri-party repo transaction processing flow.

FIG. 2 shows a generic transaction flow for a tri-party repurchase agreement where a service provider (typically a custodian bank) is interposed to ensure that each party to the transaction is never without cash (in the case of the broker/dealer/seller) or assets (in the case of the buyer/investor) throughout the term of the transaction, thereby ensuring that both parties are "whole" at all times. The presence of the third party service provider not only brings an additional layer of security to the transaction, but it also brings efficiencies and reduced costs for both principal parties to the trade.

In the tri-party repurchase agreement transaction flow shown in FIG. 2 and beginning at 210, a broker/dealer/seller and a buyer/investor first agree, between themselves, on a particular trade at 210. Thereafter, the third party service provider receives trade instructions from both the broker/dealer/seller and the buyer/investor at 220. An account administrator at the tri-party repo service provider then matches the instructions from the buyer/investor to the instructions received from the broker/dealer/seller at 230. Once a match has been confirmed by the account administrator, the broker/dealer/seller delivers the assets (such as assets 140, illustrated in FIG. 1) to the tri-party repo service provider and, at essentially the same time, the buyer/investor delivers the agreed-upon cash or loan amount (such as loan amount 150, illustrated in FIG. 1) to the tri-party repo service provider at 240. The tri-party repo service provider thereafter confirms to the buyer/investor that the assets are eligible under the terms of the tri-party agreement, and applies applicable margin to the assets per the tri-party agreement at 250. The assets are segregated in a custody account established by the tri-party repo service provider in the name of the buyer/investor at 260. The tri-party repo service provider also transfers the cash/loan amount to the broker/dealer/seller at 270 and the transaction flow process ends at 280.

SUMMARY OF THE INVENTION

Conventional repo transaction processing structure and methodologies require a large number of daily transactions and delay access to proceeds, resulting in a decrease in market liquidity. Moreover, such delays can result in an inability of buyer/investors to remit proceeds to their Federal Reserve Bank accounts in a timely manner.

Thus, in accordance with at least one embodiment of the invention, a system and method are made available that provide a mechanism and methodology that fund buyer/investors for redemption and interest payments that are due to the Federal Reserve Bank earlier in the day than is conventionally possible.

In accordance with at least one embodiment of the invention, there is provided a method for providing collateral management service for tri-party hybrid repo transactions, the method comprising: receiving, at a repo service provider, instructions specifying a tri-party hybrid repo transaction as well as a payable date for the tri-party hybrid repo transaction; on or prior to the payable date, a buyer/investor for the tri-party hybrid repo transaction receives collateral that is the subject of the tri-party hybrid repo transaction in the buyer/investor's Securities Account at the Federal Reserve Bank via the Fedwire Securities Service and free of payment or versus payment; and on or prior to the payable date, the buyer/investor returns collateral to a broker/dealer/seller for the tri-party hybrid repo transaction via the repo service provider versus payment via the Fedwire Securities Service.

DETAILED DESCRIPTION OF INVENTION

In accordance with at least one embodiment of the invention, the invention utilizes the Fedwire Securities Service, which conventionally provides a safekeeping function and a transfer and settlement function for transactions in Fedwire book-entry securities. The safekeeping function involves the electronic storage of securities records in custody accounts. The transfer and settlement function involves the transfer of book-entry securities between parties.

Transfers of Fedwire book-entry securities are initiated in the same manner as Fedwire finds transfers. More than 9,100 participants maintain reserve accounts with the Federal Reserve Bank and use the Fedwire Securities Service to hold and transfer U.S. Treasury, U.S. government agency and U.S. government-sponsored enterprise securities (including mortgage-backed securities), as well as securities issued by certain international organizations such as the World Bank. These securities are held and transferred in electronic (book-entry) form; the U.S. Treasury and international organizations no longer issue physical securities, nor do most federal agencies or similar issuers.

Conventionally, securities transfers can be made against a designated payment or free of payment. A transfer made against a designated payment, also referred to as delivery versus payment, is a securities industry procedure, common with institutional accounts, whereby delivery of securities sold is made to the buying customer in exchange for payment, usually in the form of cash. A transfer made free of payment is a transfer of securities from one party to another without the simultaneous exchange of funds. Nonetheless, most securities transfers involve the delivery of securities and the simultaneous exchange of payment for the securities, i.e., a DVP ("delivery versus payment") transaction.

In accordance with at least one embodiment of the invention, the system and method create a mechanism and methodology that fund buyer/investors for redemption and interest payments that are due to the Federal Reserve Bank early in the day (e.g., within 5, 10, 15, 20, 25 or 30 minutes, just for example, although longer times are contemplated after the opening of Fedwire at 8:30 AM Eastern Time). Early funding may be of particular utility to buyer/investors, the Federal Reserve Bank, and the holders of the securities by maintaining liquidity in the markets. The processing of DVP repos also enables the securities and cash to flow through the securities market and make the funds available immediately (e.g., within 5, 10, 15, 20, 25, or 30 minutes after 8:30 AM Eastern Time).

By implementing processes and systems in accordance with at least one embodiment of the invention, buyer/investors may be able to remit proceeds of matured repo transactions to their accounts at the Federal Reserve Bank for the daily redemptions and interest payments early in the business day (within minutes after 8:30 AM Eastern Time, e.g., by 8:45 AM to 9:00 AM Eastern Time, for example). This process, in turn, may enable the Federal Reserve Bank to wire funds to the banks and in turn to the security holder earlier than would otherwise be possible.

Figure 3:
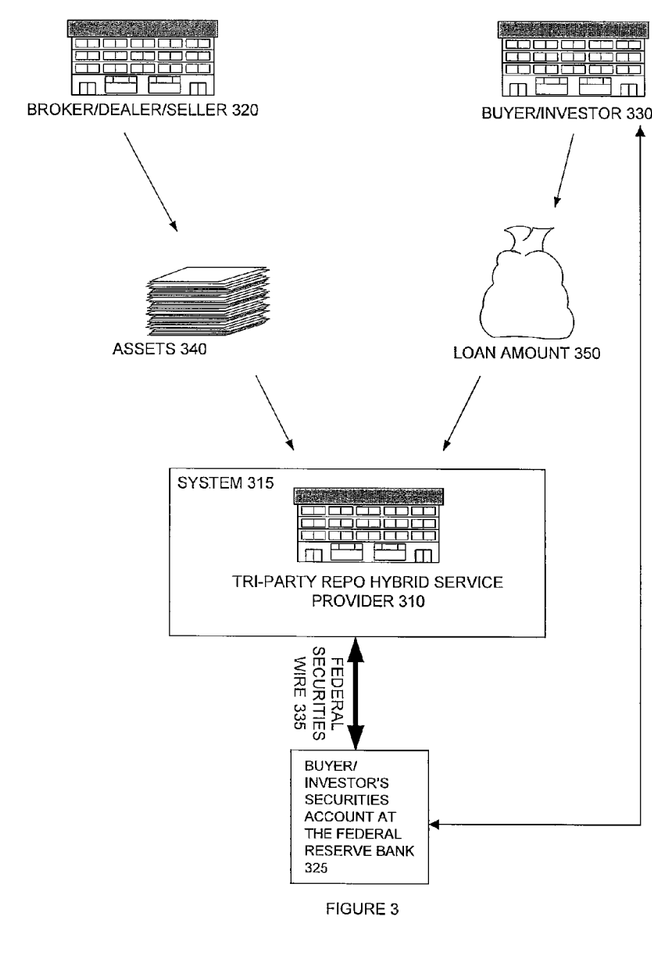
FIG. 3 illustrates one implementation of a tri-party repo hybrid processing service provider system in accordance with at least one embodiment of the invention.

As illustrated in FIG. 3, a tri-party repo hybrid transaction service provider 310 may implement a system 315 for processing, facilitating and/or managing tri-party repo hybrid transactions for broker/dealer/sellers with buyer/investors.

The tri-party repo hybrid service provider 310 utilizes a repo processing system 315 that includes and/or utilizes various interfaces configured to receive and transmit information from and to various parties involved in the tri-party repo hybrid transaction process. Though not illustrated in FIG. 3, it should be understood that the tri-party repo hybrid processing system 315 includes one or more databases and processors utilized to perform various operations in connection with the practicing of the invention, e.g., various operations illustrated by the methods of FIGS. 4-8. As such, the system 315 interacts with and utilizes the Fedwire Securities Service 335 in association with the Federal Reserve Bank 325 to perform various operations illustrated in FIGS. 4-8.

Figure 4:
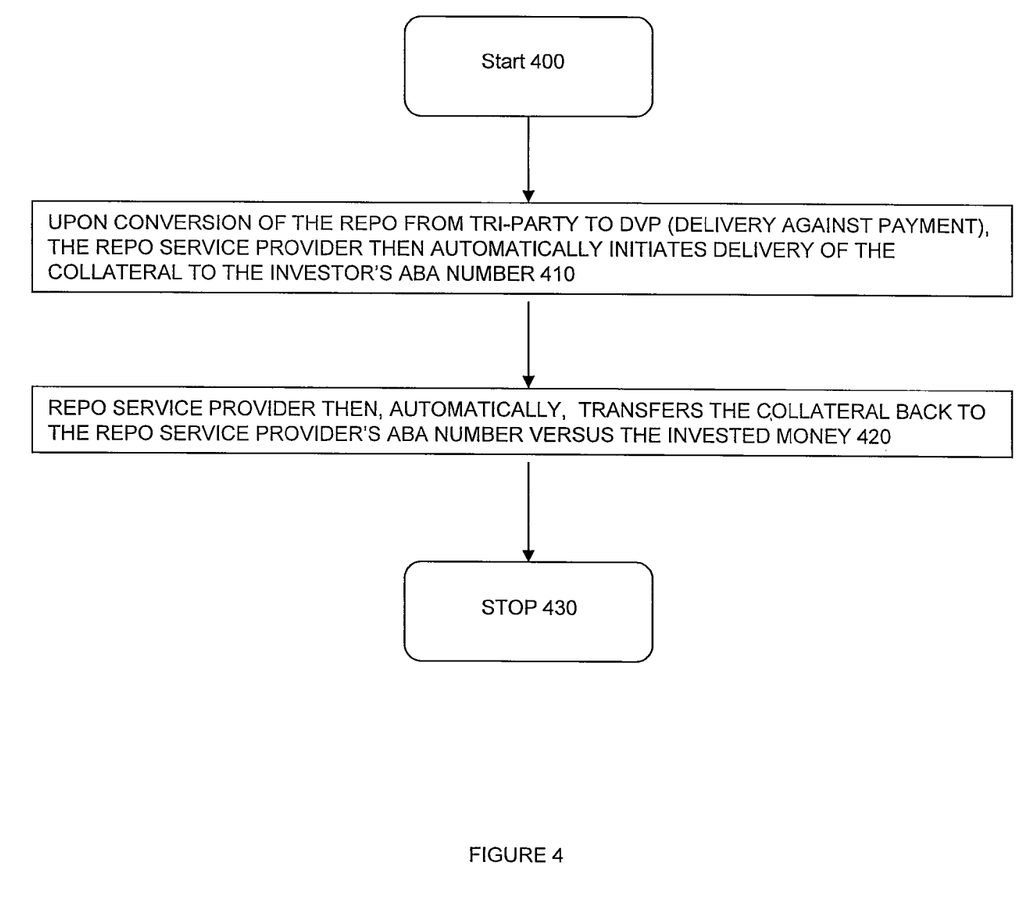
FIG. 4 illustrates structure of a tri-party hybrid transaction in accordance with at least one embodiment of the invention.

As illustrated in FIG. 4, in accordance with at least one embodiment of the invention, the tri-party hybrid facilitation and processing methodology may enable buyer/investors and broker/dealer/sellers to transact in term, tri-party repos on a daily basis. The buyer/investors may request to mature tri-party repos with the broker/dealer/sellers and receive the invested cash on or prior to a specified date, i.e., the payable date (the date that the party is obliged to pay).

In accordance with at least one embodiment of the invention, the hybrid tri-party repo transactions roll off on a specified date prior to maturity, normally the business day prior to the payable date, at which time the tri-party repo transaction becomes a DVP repo transaction. In another embodiment, however, this can take place on the date of maturity, rather than prior to the date of maturity. As shown in FIG. 4, in one embodiment the process begins at 400 and continues to the specified date prior to maturity, on which the repo service provider automatically initiates delivery of the collateral to the buyer/investor's. Securities Account at the Federal Reserve Bank (which account is administered by the repo service provider), at 410, from the repo service provider's Securities Account.

Control then proceeds to 420, at which the repo service provider then, automatically, transfers the collateral back to the repo service provider's Securities Account at the Federal Reserve Bank versus crediting by the repo service provider of the buyer/investor's account at the repo service provider for the invested money. Control then proceeds to 430 at which the process ends. The buyer/investor may then use the credits generated to fund its account at the Federal Reserve Bank; whereas, the broker/dealer/seller may not be impacted by the receipt and delivery of the collateral securities, as the transaction may be processed as a tri-party repo transaction.

As a result, processing of tri-party hybrid repos enables funding a buyer/investor's Securities Account at the Federal Reserve Bank early in the day (within minutes after 8:30 am Eastern Time) and, in turn, enabling the buyer/investor to fund the Federal Reserve Bank itself. The funding of the Federal Reserve Bank earlier in the day benefits the broker/dealer/seller as well as the repo service provider by creating cash liquidity in the marketplace.

Figure 5:
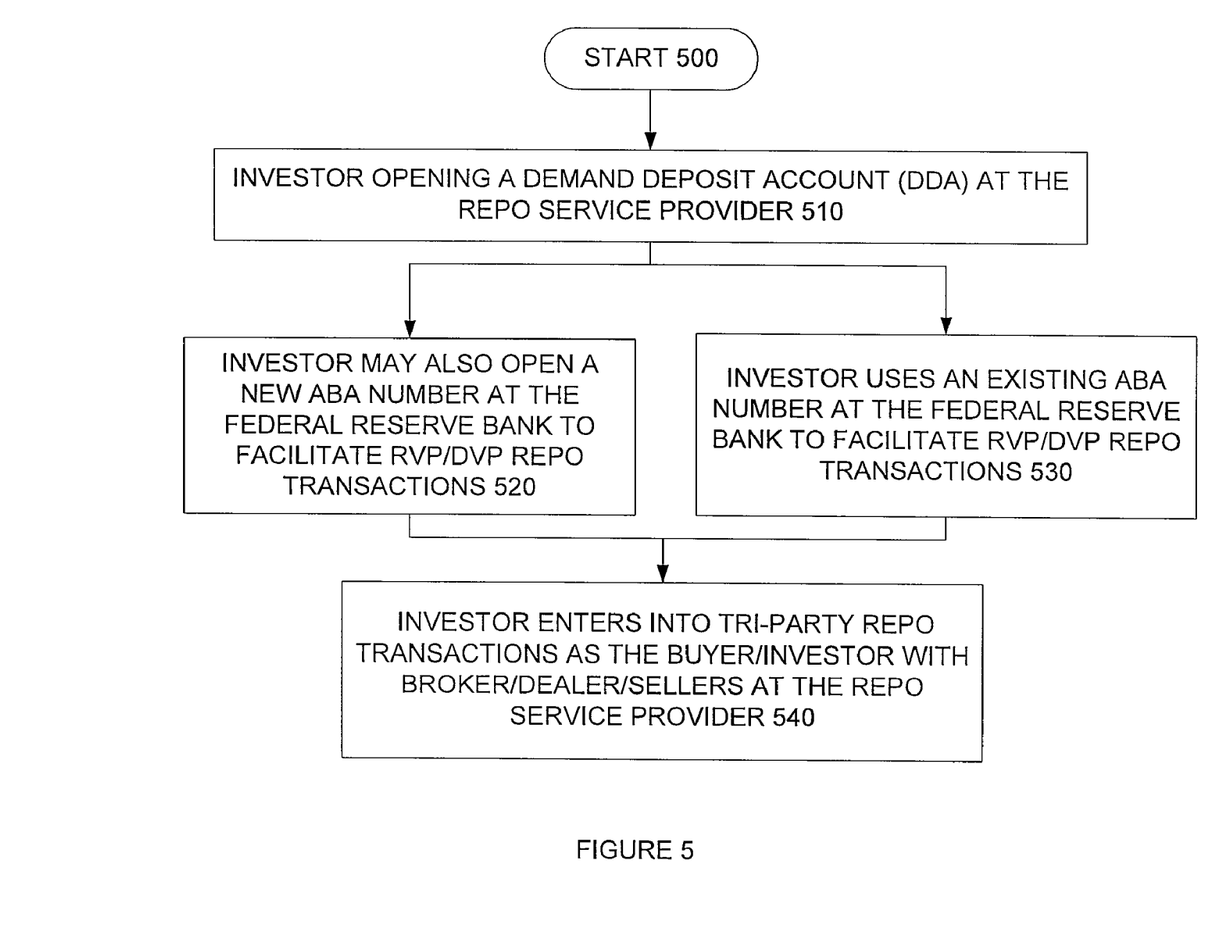
FIG. 5 provides a more detailed illustration of various tri-party hybrid processing operations performed in accordance with at least one embodiment of the invention.

As illustrated in FIG. 5, establishing a relationship between the buyer/investor and the repo service provider to process tri-party hybrid repo transactions begins at 500 and necessarily involves a buyer/investor opening a Demand Deposit Account (DDA) at the repo service provider to facilitate processing of tri-party repo transactions (510). Additionally, the buyer/investor may also open a new Securities Account (520) or use an existing account at the Federal Reserve Bank to facilitate DVP repo transactions (530). Subsequently, the buyer/investor may enter into tri-party repo transactions, in the capacity of buyer/investor, with broker/dealer/sellers with the intermediation of the repo service provider (540).

Trades may roll each day (increasing as additional funds are received), with funds remaining on deposit at the repo service provider in the buyer/investor's DDA at the repo service provider until a date prior to the payable date (such as the day prior to the payable date) or on the payable date. Collateral assigned to each tri-party repo transaction may be available for view and download the next morning or on the same day via information access systems and/or delivery portals implemented by the repo service provider.

Figure 6:
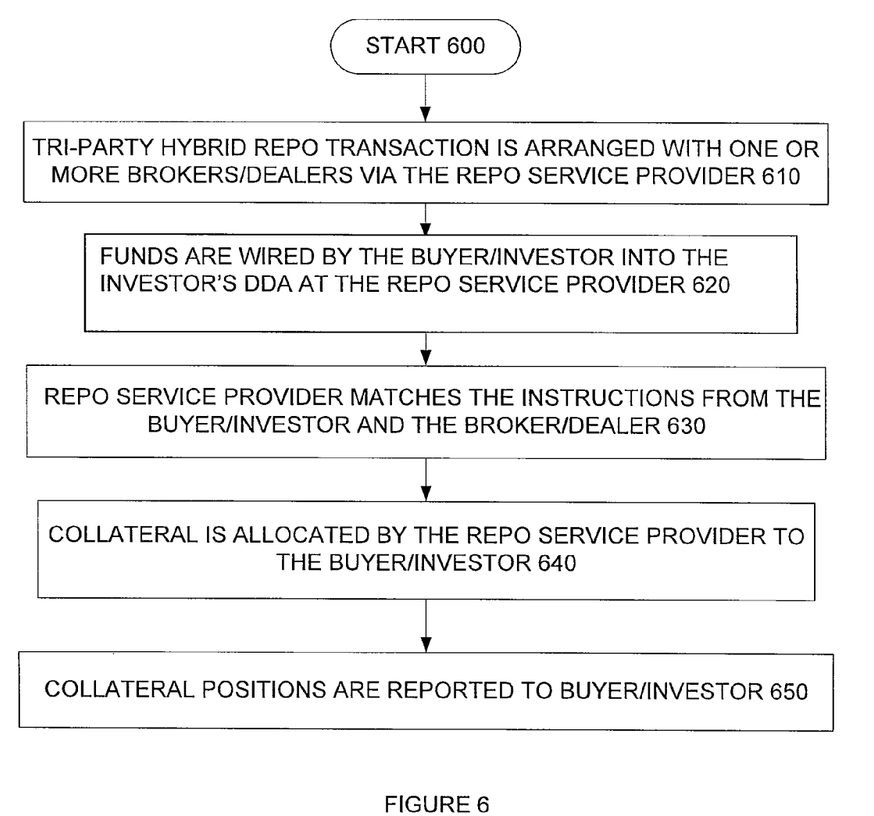
FIG. 6 provides a more detailed illustration of various tri-party hybrid process operations performed in accordance with at least one embodiment of the invention.

FIG. 6 illustrates various operations performed as part of a buyer/investor entering into a tri-party hybrid repo transaction with a broker/dealer/seller. As illustrated in FIG. 6, the process begins at 600, and the process continues to 610 at which a tri-party hybrid repo transaction is arranged with one or more brokers/dealer/sellers via the repo service provider. The process then proceeds to 620, at which the funds are wired by the buyer/investor into the buyer/investor's demand deposit account (DDA) at the repo service provider. Subsequently, at 630, the repo service provider matches the instructions from the buyer/investor and the broker/dealer/seller. Subsequently, at 640, the collateral is allocated by the repo service provider to the buyer/investor. At 650, the collateral positions are reported to the buyer/investor (e.g., periodically, for example, daily).

Figure 7:
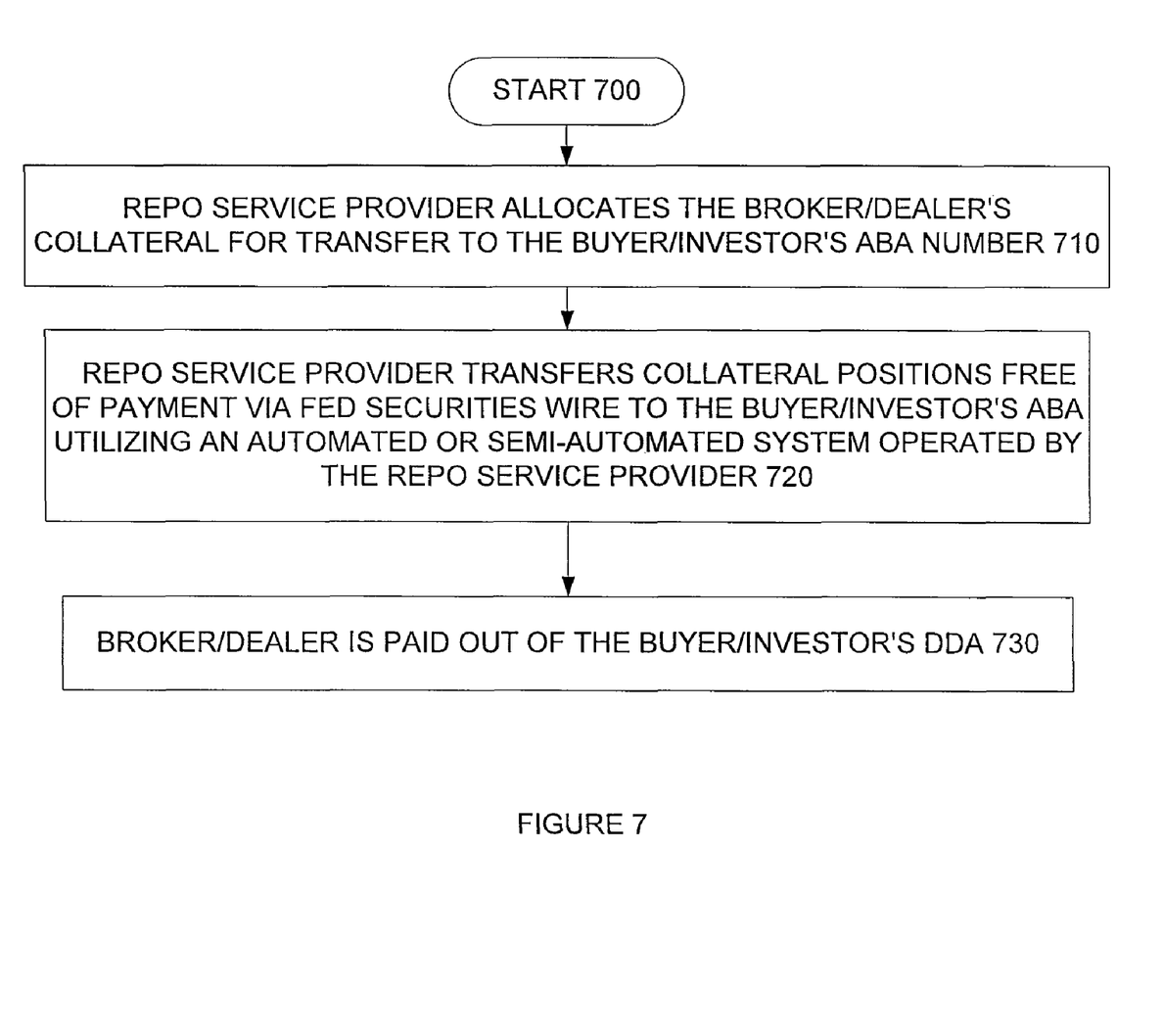
FIG. 7 provides a more detailed illustration of various tri-party hybrid process operations performed in accordance with at least one embodiment of the invention.

FIG. 7 illustrates, in further detail, various operations (illustrated in FIG. 4) performed either on or prior to (e.g., the day before) a payable date, in accordance with at least one embodiment of the invention, to enable a buyer/investor to receive collateral in its Securities Account at a Federal Reserve Bank free of payment associated with the receipt of that collateral or against payment if the funds have been returned to the buyer/investor. The operations begin at 700; subsequently, at 710, the repo service provider allocates the broker/dealer/seller's collateral for transfer to the buyer/investor's Securities Account. Subsequently, at 720, the repo service provider transfers collateral positions free of payment or against payment if the funds have been returned to the buyer/investor via the Fedwire Securities Service to the buyer/investor's Securities Account utilizing an automated or semi-automated system operated by the repo service provider. Thus, for example, prior to the payable date, the collateral may be returned DVP via the Fedwire Securities Service, as soon as the Service opens (e.g., 8:30 a.m. Eastern time), generating credits in the buyer/investor's Securities Account. The repo service provider then handles all transactions that flow through buyer/investor's Securities Account.

Subsequently, or concurrently, at 730 the broker/dealer/seller is paid out of the buyer/investor's DDA at the repo service provider utilizing an automated or semi-automated system operated by the repo service provider. Subsequently, the return of DVP collateral may appear as a tri-party unwind (i.e., the unwinding of a matured tri-party repo) for the broker/dealer/seller.

Figure 8:
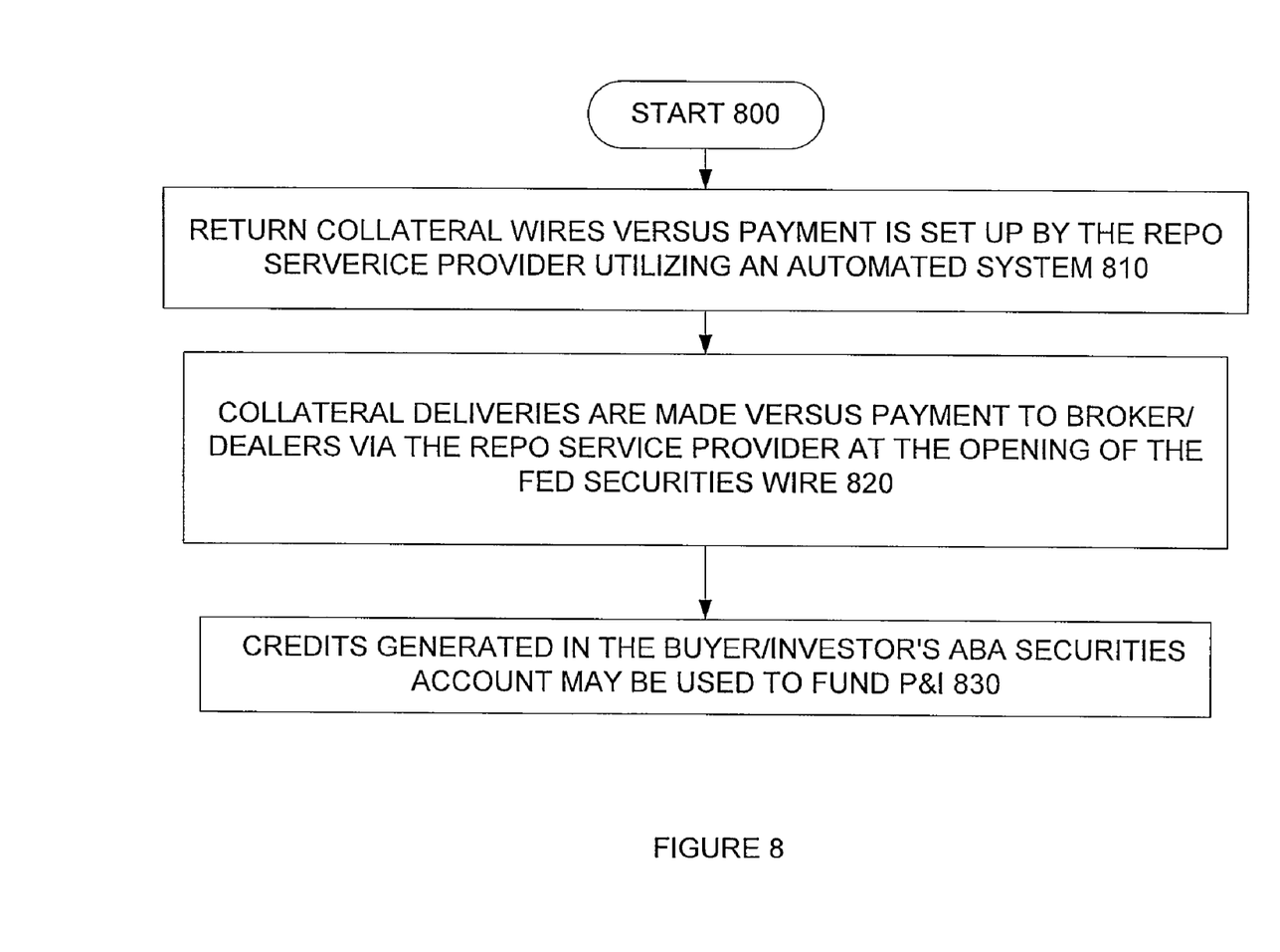
FIG. 8 illustrates various operations performed on the payable date, in accordance with at least one embodiment of the invention.

FIG. 8 illustrates various operations performed on the payable date, in accordance with at least one embodiment of the invention, to enable return of the collateral from the buyer/investor versus payment to the broker/dealer/seller via the repo service provider. Operations begin at 800 and process operations proceed to 810 at which the instructions on the Fedwire Securities Service for return of collateral versus payment is set up by the repo service provider utilizing an automated system. Subsequently, the process proceeds to 820, at which collateral deliveries are made versus payment to broker/dealer/sellers via the repo service provider at the opening of the Fedwire Securities Service. As a result, at 830, credits generated in the buyer/investor's Securities Account may be used to fund principal and interest.

Figure 9:
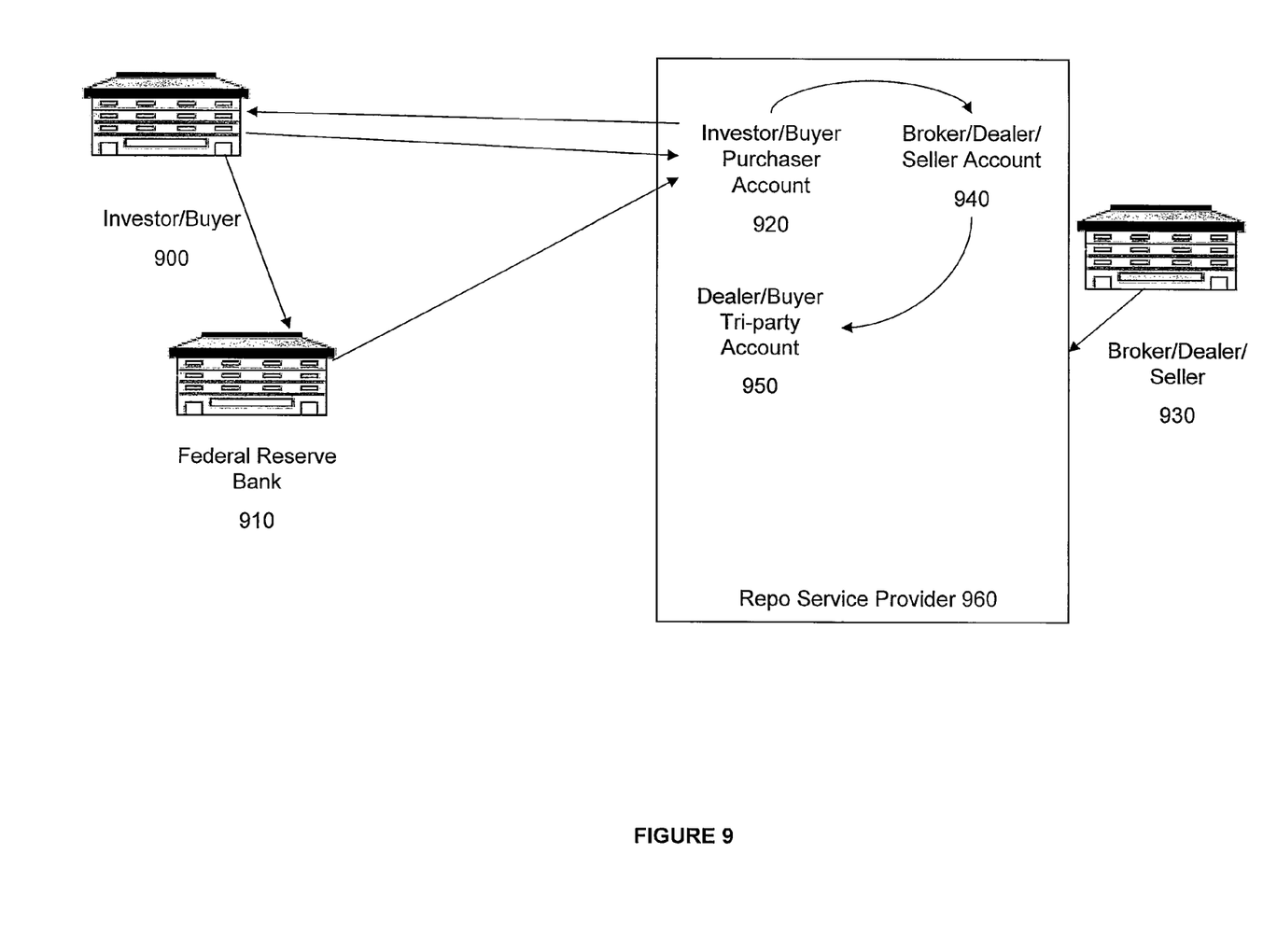
FIGS. 9-13 illustrate various operations that further facilitate an understanding of the present invention.

FIG. 9 illustrates, in further detail, the operations performed as part of a investor/buyer 900 entering into a tri-party hybrid repo transaction with a broker/dealer/seller 930. The investor/buyer 900 instructs the transfer of funds from the Federal Reserve Bank 910 via the Fedwire Security System ("Fedwire") to the investor/buyer purchaser account 920 at the repo service provider 960. The investor/buyer purchaser account 920 is the investor/buyer's account at the repo service provider 960. Subsequently, or concurrently, the dealer 930 sends instructions specifying the tri-party hybrid repo transaction to the repo service provider 960. The repo service provider 960 then matches the try-party hybrid repo transaction instructions from the investor/buyer 900 and the broker/dealer/seller 930. Subsequently, the repo service provider 960 allocates the collateral from the broker/dealer/seller's account 940 to the dealer/buyer tri-party account 950 at the repo service provider 960 in accordance with the instructions. The tri-party account 950 may be an account in which the securities are held by the repo service provider 960 on behalf of the investor/buyer 900.

Figure 10:
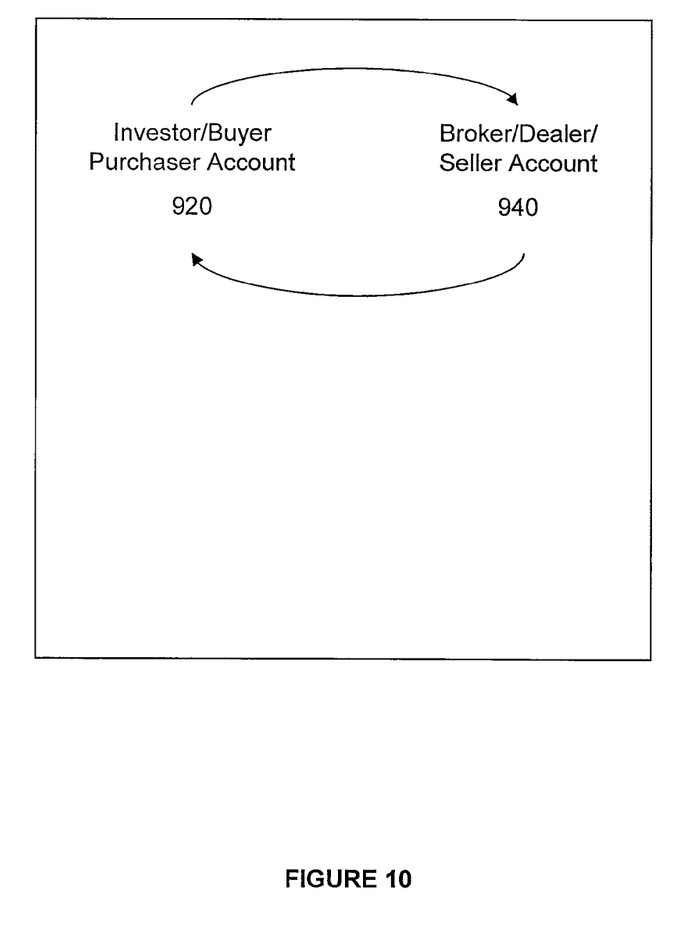

FIG. 10 illustrates a typical repo transaction, commonly used in the market, in which the collateral is returned to the broker/dealer/seller account 940 and the funds are returned to the investor/buyer purchaser account 920 at the repo service provider in the morning during the term of the repo.

Figure 11:
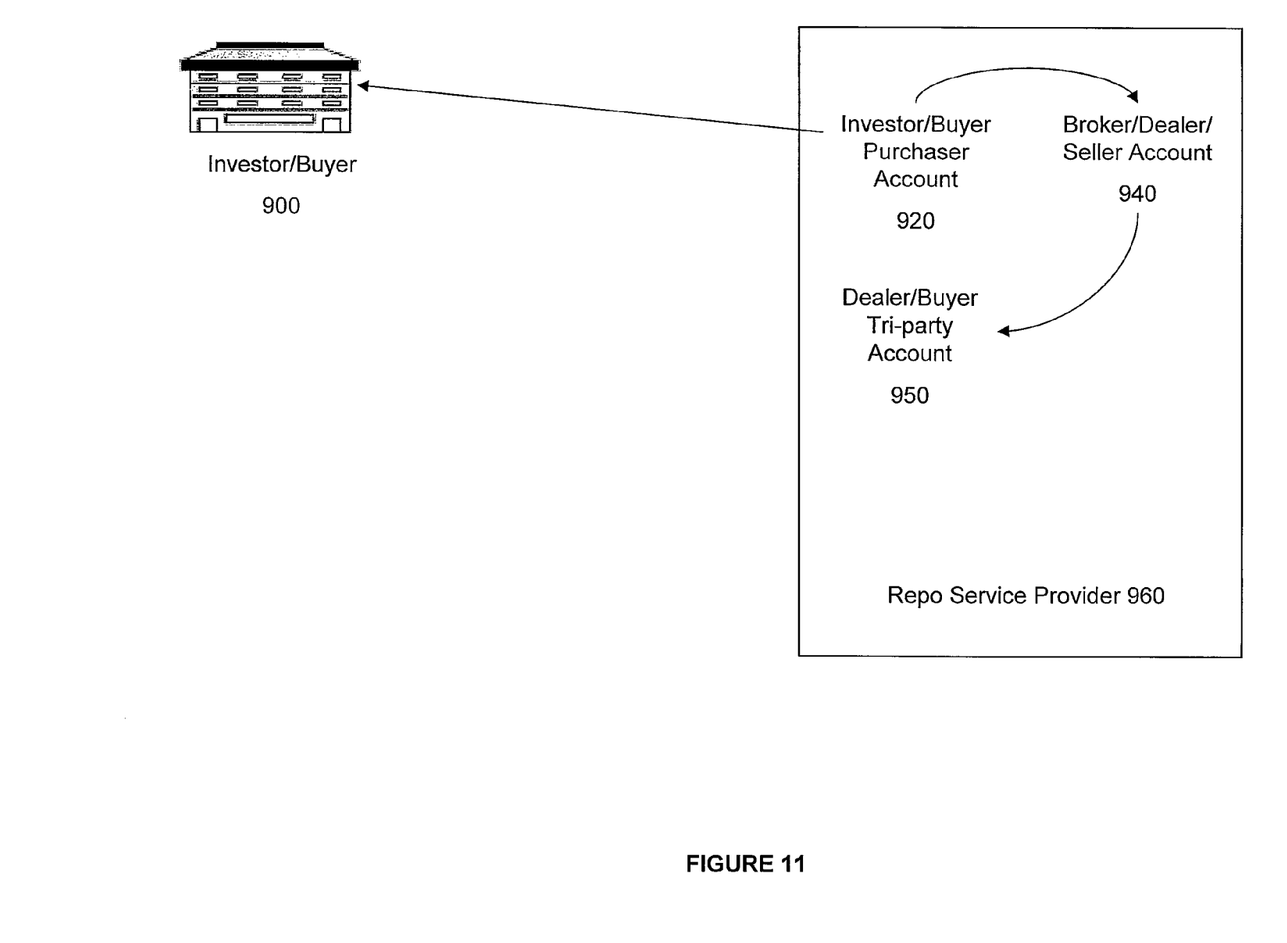

FIG. 11 illustrates the various operations performed at the end of each day during the term of a typical tri-party repo. The repo service provider 960 allocates collateral from the broker/dealer/seller's account 940 at the repo service provider 960 to a dealer/buyer tri-party account 950. The tri-party account 950 may be an account in which the securities are held by the repo service provider 960 on behalf of the investor/buyer 900. The repo service provider 960 ensures that the collateral matches the terms of the repo agreement before approving a transfer of finds from the investor/buyer purchaser account 920 at the repo service provider 960 to the dealer account 940 at the repo service provider 960. Subsequently, the repo service provider 960 submits a report (e.g., collateral price file) listing the securities and their market values to the investor/buyer 900.

Figure 12:
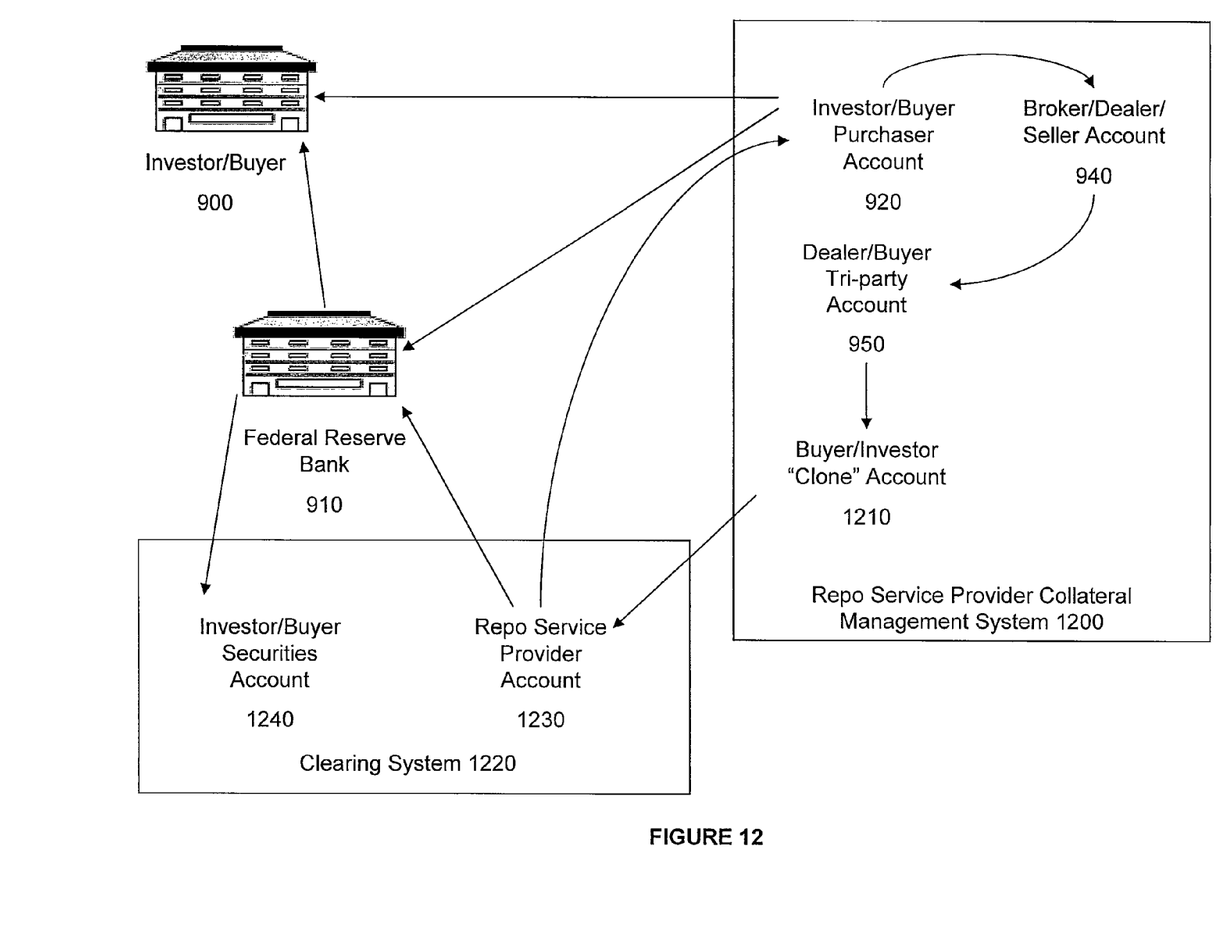

FIG. 12 illustrates various operations of a tri-party hybrid repo transaction performed on or prior to a payable date (e.g., on the day prior to the maturity date), in accordance with at least one embodiment of the invention, to enable a investor/buyer 900 to receive collateral in its securities account 1240 at the Federal Reserve Bank against payment.

A collateral management system 1200 of the invention may include a broker/dealer/seller account 940 at the repo service provider, an investor/buyer purchaser account 920 at the repo service provider, a dealer/buyer tri-party account 950 at the repo service provider, and a clone account 1210 at the repo service provider. The broker/dealer/seller 930 allocates collateral prior to the closing of Fedwire (e.g., before 3:30 pm Eastern Time). Typically in tri-party repo transactions, collateral is allocated after the closing of the Fedwire (e.g., after 3:30 pm Eastern Time). During allocation of the collateral, the collateral is transferred from the broker/dealer/seller account 940 at the repo service provider to the dealer/buyer tri-party account 950 at the repo service provider. The dealer/buyer tri-party account 950 is typically an account in which the collateral is held by a bank in the tri-party repo on behalf of the investor/buyer 900. The repo service provider then copies or "clones" the collateral into another account 1210 at the repo service provider. Subsequently, the repo service provider returns the funds from the investor/buyer purchaser account 920, which may include tri-party aggregation and DDA, at the repo service provider to the investor/buyer's account 1240 at the Federal Reserve Bank 910.

The collateral is then posted on a clearing system into a repo service provider's account 1230 owned by the repo service provider at the Federal Reserve Bank 910. The clearing system 1220 may include a investor/buyer securities account 1240 owned by the investor/buyer 900 (which may be administered by the repo service provider) and a repo service provider's account 1230 owned by the repo service provider. The repo service provider then delivers the collateral against payment via Fedwire to the investor/buyer securities account 1240 owned by the investor/buyer 900. The effect of this operation is the transfer of securities via Fedwire from the repo service provider's account 1230 to the investor/buyer's securities account 1240 at the Federal Reserve Bank 910. The ownership of the collateral changes to the investor/buyer. As a result of the transfers in the clearing system 1220, the tri-party repo becomes a DVP. The repo service provider receives the funds in the repo service provider account 1230 at the Federal Reserve Bank 910, while the investor/buyer receives the collateral in the investor/buyer securities account 1240 at the Federal Reserve Bank 910.

Subsequently, or concurrently, the repo service provider posts the funds received from the DVP into the investor/buyer's purchaser account 920 at the repo service provider. The repo service provider approves the transfer of funds from the investor/buyer's purchaser account 920 into the broker/dealer/seller's account 940 at the repo service provider. Subsequently, the repo service provider submits a report (e.g., collateral price list) listing the securities used as collateral in the transfers and their market values to the investor/buyer 900.

Figure 13:
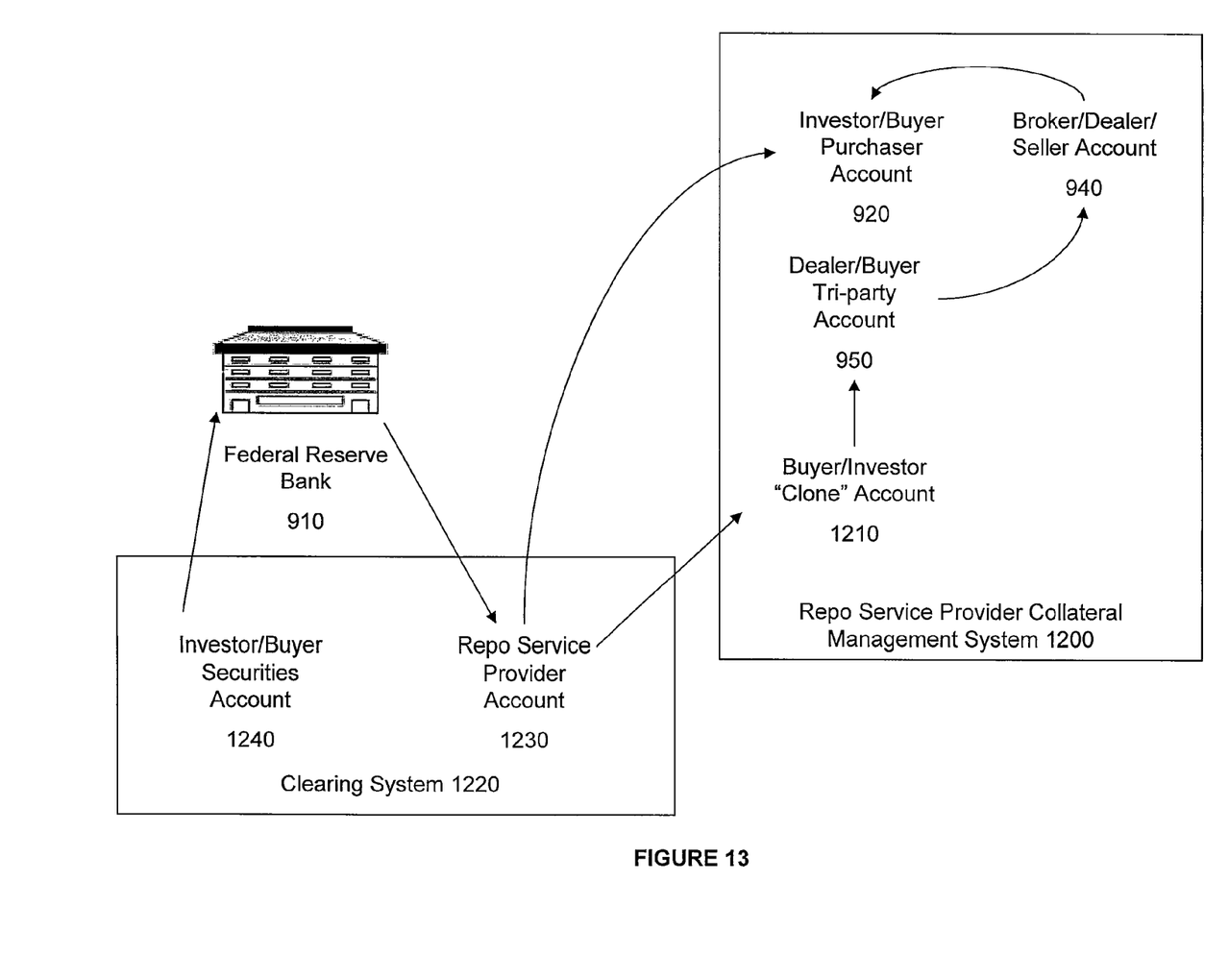

FIG. 13 illustrates various operations performed on or prior to the payable date (e.g., on the maturity date), in accordance with at least one embodiment of the invention, to enable return of the collateral from the investor/buyer 900 versus payment to the broker/dealer/seller 930 via the repo service provider early in the morning when Fedwire opens (e.g., 8:30 am Eastern Time). The repo service provider initiates the delivery versus payment of the collateral from the investor/buyer's securities account 1240 owned by investor/buyer 900 at the Federal Reserve Bank 910 to the repo service provider's account 1230 owned by the repo service provider at the Federal Reserve Bank 910. The funds are then credited to the investor/buyer's securities account 1240 at the Federal Reserve Bank 910 via DVP. This transaction is a receive versus payment, in which the repo service provider receives the collateral and pays funds in its repo service provider account at the Federal Reserve Bank in exchange for the collateral. The return of DVP collateral may appear as a tri-party unwind for the dealer/broker/seller 930, in which the collateral is released from the investor/buyer's securities account 1240, the clone account 1210, and the dealer/buyer tri-party account 950. Subsequently, the collateral is returned from the dealer/buyer tri-party account 950 to the dealer/broker/seller account 940 at the repo service provider. The repo service provider then returns the funds from the dealer/broker/seller account 940 to the investor/buyer purchaser account 920 at the repo service provider. Subsequently, the funds are debited from the investor/buyer purchaser account 920 at the repo service provider.

As will be appreciated by those skilled in the art, the present invention provides several enhancements to repo transaction processing. Embodiments of the present invention enable improved timeliness in processing transactions and funding various related accounts, which, in turn, leads to increased liquidity in the market place. The Invention also facilitates the processing of DVP repo transactions for Investors who may not have the degree of systems automation to initiate the transactions. Rather, the Investor uses the processing capabilities of the triparty service provider and updates its books and records based on actual DVP transactions and download files provided by the triparty service provider.

Those skilled in the art will appreciate that the embodiments of the present invention can be implemented using computer, database, communications and programming technology, each of which implements hardware or software or any combination thereof. The present invention may take the form of a computer program product on a computer-readable storage medium having computer-readable program code means embodied in any suitable computer-readable storage medium, including hard disks, CD-ROM, RAM, ROM, optical storage devices, magnetic storage devices, and/or the like.

The methods/processes of the invention occurring in the repo service provider collateral management system 1200 and the clearing system 1220, including the processes for converting a hybrid repo transaction into a DVP transaction and transferring and returning collateral and funds, may be implemented by computer program instructions that may be loaded onto a general purpose computer, special purpose computer, or other programmable data processing apparatus implementing hardware and/or software to produce a machine. The collateral management system 1200 and the clearing system 1220 may be practiced in network computing environments with various types of system configurations, implementing hardware and/or software including personal computers, hand-held devices, multi-processor systems, micro-processor-based or programmable consumer electronics, network PCS, minicomputers, mainframe computers, and the like. The invention may also be practiced in distributed computing environments where tasks (e.g., creating a buyer/investor clone account 1210 for collateral, transferring collateral into the dealer/buyer tri-party account 950) are performed by local and remote processing devices that are linked (either by hardwired links, wireless links, or by a combination of hardwired or wireless links) through a communications network. Furthermore, the clearing system 1220 may use Fedwire to transmit funds and collateral between the investor/buyer securities account 1240 and the repo service provider account 1230 at the Federal Reserve Bank 910. Fedwire is a real-time gross settlement system owned and operated by the Federal Reserve Bank 910 that enables participants to make final payments in central bank money. Fedwire consists of a set of computer applications that route and settle payment orders and is supported by a national communications network.

Furthermore, those skilled in the art will recognize that any of a number of variations in the methods of sending or receiving information (e.g., instructions specifying the tri-party hybrid repo transaction) to or from the repo service provider 960 could be used to implement the methods of the various embodiments of the present invention. For example, in a variation of the systems described above, instructions specifying a repo transaction may be given by a investor/buyer 900 or broker/dealer/seller 930 to the repo service provider 960 via network connections (e.g., Internet, LAN, WAN), telecommunication (e.g., telephone, ISDN, ADSL), other wire and wireless transmission, or any other current or future acceptable communication facility and may further employ encryption over the interface. The investor/buyer 900 or broker/dealer/seller 930 may use a general purpose computer, PDA, Blackberry, telephone, or any other communication apparatus implementing hardware and/or software to send instructions to the repo service provider 960 and to receive information (e.g., collateral price file) from the repo service provider 960.

Those skilled in the art will further appreciate that the embodiments described herein are not limited to any specific software package, operating system, communications network, protocol or computer hardware.

The foregoing disclosure of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A computer-implemented method for providing collateral management service for tri-party hybrid repo transactions, the method comprising:
   receiving, at a repo service provider, instructions specifying a tri-party hybrid repo transaction as well as a payable date for the tri-party hybrid repo transaction;
   on or prior to the payable date, the repo service provider provides confirmation to a buyer/investor for the tri-party hybrid repo transaction that collateral that is the subject of the tri-party hybrid repo transaction has been received in the buyer/investor's Securities Account at the Federal Reserve Bank via the Fedwire Securities Service and free of payment or versus payment; and
   on or prior to the payable date, the repo service provider provides confirmation to the buyer/investor that collateral has been returned to a broker/dealer/seller for the tri-party hybrid repo transaction via the repo service provider versus payment via the Fedwire Securities Service, wherein said instructions are received in a computer processor over a computer network connection,
   wherein an indication of said receipt of said collateral that is the subject of the tri-party hybrid repo transaction is stored in a database arranged in a memory coupled to the computer processor, and
   wherein an indication of said return of said collateral to the broker/dealer/seller for the tri-party hybrid repo transaction via the repo service provider is stored in the database.

2. The method of claim 1, wherein the buyer/investor receiving collateral positions versus payment or free of payment further comprises:
   the repo service provider allocating the broker/dealer/seller's collateral for transfer to the buyer/investor's Securities Account;
   the repo service provider transferring the collateral positions via the Fedwire Securities Service to the buyer/investor's Securities Account at the Federal Reserve Bank.

3. The method of claim 2, further comprising, subsequent to the allocation of the collateral to the buyer/investor, periodically reporting collateral positions to the buyer/investor via the computer network.

4. The method of claim 1, wherein the buyer/investor returning the collateral to the broker/dealer/seller further comprises transferring the collateral back from the buyer/investor's Securities Account to the repo service provider's Securities Account number versus crediting by the repo service provider of the transaction proceeds to the buyer/investor's DDA at the repo service provider.

5. The method of claim 1, wherein the broker/dealer/seller is paid out of the buyer/investor's demand deposit account (DDA) at the repo service provider.

6. The method of claim 1, wherein, prior to the payable date of the tri-party hybrid repo transaction, the tri-party repo transaction becomes a delivery repo transaction.

7. The method of claim 1, further comprising opening a demand deposit account (DDA) for the buyer/investor at the repo service provider.

8. The method of claim 1, further comprising designating a Securities Account at the Federal Reserve Bank for facilitating delivery repo transactions for the buyer/investor.

9. The method of claim 1, wherein the collateral that is the subject of each tri-party hybrid repo transaction is available for view and download over the computer network via at least one of an information access system and a delivery portal implemented by the repo service provider.

10. The method of claim 1, wherein the receipt of instructions specifying a tri-party hybrid repo transaction further comprises matching instructions from the buyer/investor and the broker/dealer/seller in the computer processor.

11. The method of claim 1, wherein return of the collateral via delivery repo appears as a tri-party unwind for the broker/dealer/seller.

12. The method of claim 1, wherein the buyer/investor for the tri-party hybrid repo transaction receives the collateral prior to the payable date.

13. The method of claim 12, wherein the investor returns the collateral to the dealer on the payable date.

14. The method of claim 1, wherein the buyer/investor for the tri-party hybrid repo transaction receives said collateral that is the subject of the tri-party hybrid repo transaction prior to the payable date, and
   wherein the buyer/investor returns collateral to the broker/dealer/seller for the tri-party hybrid repo transaction on the payable date.

15. The method of claim 14, wherein the buyer/investor receiving collateral positions versus payment or free of payment further comprises:
   the repo service provider allocating the broker/dealer/seller's collateral for transfer to the buyer/investor's Securities Account;
   the repo service provider transferring the collateral positions via the Fedwire Securities Service to the buyer/investor's Securities Account at the Federal Reserve Bank.

16. The method of claim 15, further comprising, subsequent to the allocation of the collateral to the buyer/investor, periodically reporting collateral positions to the buyer/investor via the computer network.

17. The method of claim 14, wherein the buyer/investor returning the collateral to the broker/dealer/seller further comprises transferring the collateral back from the buyer/investor's Securities Account to the repo service provider's Securities Account number versus crediting by the repo service provider of the transaction proceeds to the buyer/investor's DDA at the repo service provider.

18. The method of claim 14, wherein the broker/dealer/seller is paid out of the buyer/investor's demand deposit account (DDA) at the repo service provider.

19. The method of claim 14, wherein, prior to the payable date of the tri-party hybrid repo transaction, the tri-party repo transaction becomes a delivery repo transaction.

20. The method of claim 14, further comprising opening a demand deposit account (DDA) for the buyer/investor at the repo service provider.

21. The method of claim 14, further comprising designating a Securities Account at the Federal Reserve Bank for facilitating delivery repo transactions for the buyer/investor.

22. The method of claim 14, wherein the collateral that is the subject of each tri-party hybrid repo transaction is available for view and download over the computer network via at least one of an information access system and a delivery portal implemented by the repo service provider.

23. The method of claim 14, wherein the receipt of instructions specifying a tri-party hybrid repo transaction further comprises matching instructions from the buyer/investor and the broker/dealer/seller in the computer processor.

24. The method of claim 14, wherein return of the collateral via delivery repo appears as a tri-party unwind for the broker/dealer/seller.

* * * * *